US009325683B2

(12) United States Patent
Sebastian et al.

(10) Patent No.: US 9,325,683 B2
(45) Date of Patent: Apr. 26, 2016

(54) MOBILE APPLICATION MANAGEMENT FRAMEWORK

(71) Applicant: Infosys Limited, Bangalore (IN)

(72) Inventors: Sony Sebastian, Bangalore (IN); Rajesh Kalyanasundaram, Bangalore (IN); Sudharshan Shankavaram, Bangalore (IN)

(73) Assignee: Infosys Limited, Bangalore (IN)

( * ) Notice: Subject to any disclaimer, the term of this patent is extended or adjusted under 35 U.S.C. 154(b) by 92 days.

(21) Appl. No.: 13/918,784

(22) Filed: Jun. 14, 2013

(65) Prior Publication Data

US 2013/0340048 A1      Dec. 19, 2013

(30) Foreign Application Priority Data

Jun. 18, 2012  (IN) ............................ 2402/CHE/2012

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04W 12/06* | (2009.01) |
| *H04L 9/00* | (2006.01) |
| *G06F 21/00* | (2013.01) |
| *G06F 21/44* | (2013.01) |
| *H04L 9/32* | (2006.01) |

(52) U.S. Cl.
CPC ............... *H04L 63/08* (2013.01); *H04L 63/02* (2013.01); *H04L 63/107* (2013.01); *H04W 12/06* (2013.01); *G06F 21/00* (2013.01); *G06F 21/44* (2013.01); *H04L 9/00* (2013.01); *H04L 9/32* (2013.01); *H04L 63/0823* (2013.01)

(58) Field of Classification Search
CPC ..... H04L 63/08; H04L 63/02; H04L 63/0823; H04L 9/00; H04L 9/32; H04W 12/06; G06F 21/00; G06F 21/44
USPC ................... 713/168, 173, 175; 726/4, 26–29
See application file for complete search history.

(56) References Cited

U.S. PATENT DOCUMENTS

| | | | | |
|---|---|---|---|---|
| 8,656,475 | B2* | 2/2014 | Eom ...................... | G06F 21/335 709/229 |
| 2002/0078380 | A1* | 6/2002 | Lin ......................... | G06F 21/10 726/28 |
| 2010/0056105 | A1* | 3/2010 | Erhart et al. .................. | 455/411 |
| 2011/0265165 | A1* | 10/2011 | Lam ........................ | G06F 21/41 726/7 |
| 2012/0002813 | A1* | 1/2012 | Wei et al. ...................... | 380/270 |
| 2012/0240211 | A1* | 9/2012 | Counterman ..................... | 726/9 |
| 2012/0311322 | A1* | 12/2012 | Koyun ............... | G06Q 20/3227 713/156 |
| 2013/0086669 | A1* | 4/2013 | Sondhi et al. ...................... | 726/8 |
| 2013/0139235 | A1* | 5/2013 | Counterman ..................... | 726/7 |
| 2013/0252585 | A1* | 9/2013 | Moshir ................... | G06F 21/35 455/411 |
| 2013/0254850 | A1* | 9/2013 | Alison ................. | H04W 4/206 726/4 |
| 2014/0162598 | A1* | 6/2014 | Villa-Real ..................... | 455/411 |

* cited by examiner

*Primary Examiner* — Jayesh Jhaveri
(74) *Attorney, Agent, or Firm* — Klarquist Sparkman, LLP

(57) ABSTRACT

An intermediate gateway is positioned between a client device and a mobile application service provider. The intermediate gateway can assist in securing and managing accesses from a mobile application on the client device to the mobile application service provider. The intermediate gateway can store a client device identification associated with the client device, which can be used to authenticate the client device. Other parameters can also be used in device authentication.

20 Claims, 12 Drawing Sheets

MOBILE APPLICATION MANAGEMENT FRAMEWORK

BACKGROUND

The line between mobile devices (e.g., cell phones, smartphones, Personal Digital Assistant (PDA), etc.) and personal computers is blurring. Traditionally, mobile devices are so-called "thin" clients. A thin client is one that relies heavily on a server computer to fulfill traditional computational roles. The notion of a thin client extends directly to any client-server architecture so that a thin-client application is simply one which relies on its associated server to process most or all of its business logic. However, the trend is for client applications to become fatter, particularly in the area of web development, so that client applications take on more of the computational roles (i.e., business logic). Thus, more and more people are using mobile devices to perform secure transactions. Yet, because of inherent security concerns, mobile devices do not have the same breadth of trusted connectivity found on desktop and laptop computer platforms. For example, mobile device users are reluctant to access confidential information and/or perform financial transactions with a mobile device. Similarly, service providers, such as banks, online payment services and providers of confidential information are less likely to offer access to their services through mobile devices. As a result, mobile device users are limited by the types and availability of many online services, particularly in the business-to-consumer (B2C) or business-to-business (B2B) environment.

For business-to-enterprise (B2E) applications, online services for mobile devices are straight forward and available as service providers can manage application data stored on an employee's mobile device. Mobile device management software allows the service providers to perform tasks on a mobile device, like remote wipe, remote locking, GPS tracking, device configuration, etc. Such control is clearly not acceptable in B2C or B2B environments. In such environments, service providers simply cannot take over a user's mobile device and erase data, perform locks, etc. That is why in the B2C and B2B environments, device misuse creates a larger security concern, especially as fat clients become more prevalent. If a malicious user (such as a person that steals a mobile phone) attempts to access a mobile application server or access application data offline, there is currently limited ability to control this type of unwarranted access.

SUMMARY

The present application describes an intermediate gateway positioned between a client device and a mobile application service provider. The intermediate gateway can assist in securing and managing accesses from a mobile application on the client device to the mobile application service provider. The intermediate gateway can store a client device identification associated with the client device, which can be used to authenticate the client device. Other parameters can also be used in device authentication.

In one embodiment, a client device can first be registered with the intermediate gateway. The intermediate gateway can receive a request from a mobile application on the client device to access a mobile application service provider. The request can include a device identification and user credentials. The intermediate gateway positioned between the client device and the mobile application service provider can transmit at least the user credentials to the mobile application service provider for authentication.

One advantage of the intermediate gateway is that in case of loss of a mobile device, a user can easily block access to the application by contacting a call center of the application service provider. A device identification to be blocked can be provided to the intermediate gateway database. The next time that the client device attempts to access the application service provider, the application data can be erased. For example, a push notification can be sent to the mobile device after updating the intermediate gateway database. If the user opens the notification, the application data can be erased. Alternatively, the next time the client device requests access to the mobile application service provider, the intermediate gateway can erase the application data. This allows some control of data associated with an application on a client device even though it is a business environment in which businesses are not allowed to control the client device itself (such as B2C or B2B).

In another embodiment, the intermediate gateway can provide strong device application data encryption based on the keys. Such keys help prevent offline application data attacks.

In yet another embodiment, tight version control of mobile application can be maintained by the intermediate gateway. If security patches are implemented in a new release of the mobile application, then user can be informed of an upgrade. The upgrade can be optional or mandatory as selected by the application service provider.

In yet another embodiment, location-based tracking of requests received from mobile device can be controlled by the intermediate gateway. For example, the intermediate gateway can check a GPS-based location of the client device and transmit the request to the mobile application service provider only if the GPS-location matches a location authentication algorithm. In a simple example, if the request is received from a new city/area not frequented by the user then the intermediate gateway can send a passcode to the mobile device via SMS, Email or other means. The user can then enter the passcode to proceed with the request. The location-based authentication can be enabled or disabled by the user.

In still another embodiment, the intermediate gateway can track usage statistics and provide an audit trail.

The foregoing and other objects, features, and advantages of the invention will become more apparent from the following detailed description, which proceeds with reference to the accompanying figures.

BRIEF DESCRIPTION OF THE DRAWINGS

FIG. 1 is a system diagram illustrating a mobile device, a mobile application service provider, and an intermediate gateway positioned there between.

DETAILED DESCRIPTION

Figure 1:
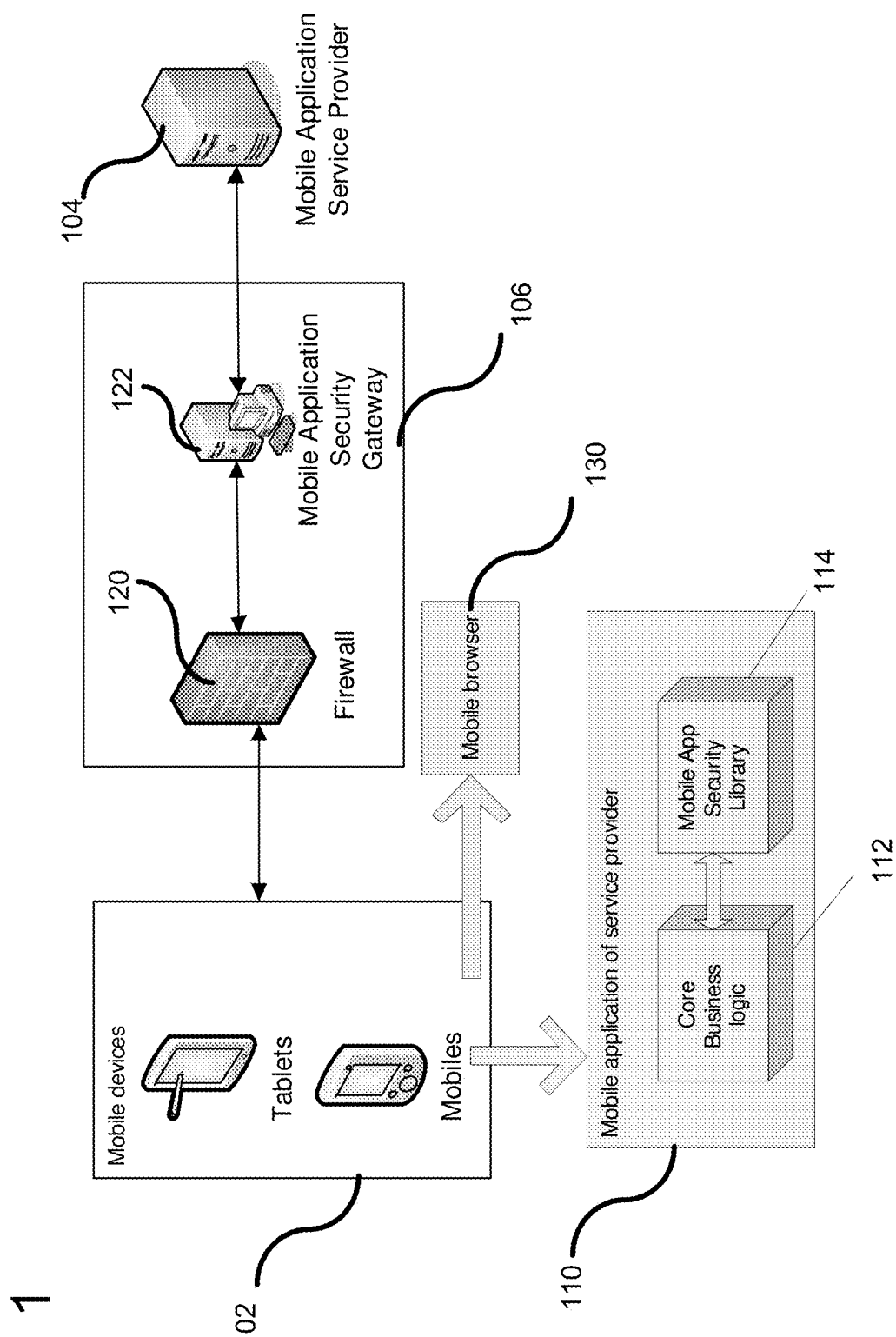

FIG. 1 is an exemplary system diagram showing one or more mobile devices 102 coupled to a mobile application service provider 104 via an intermediate gateway 106. The one or more mobile devices 102 can be any of a variety of mobile devices, such as tablets, PDAs, phones, etc. A mobile application 110 is shown having core business logic 112 and a mobile application security library 114. The core business logic 112 is used in conjunction with business logic on the mobile application service provider 104 to implement the desired functionality. The mobile application can communicate with the mobile application service provider using a browser 130 coupled to the intermediate gateway via the Internet or other network. The mobile application 110 is typically an application that is provided by the mobile application service provider 104 and is downloaded directly from the mobile application service provider 104, from an application store, or other means. The mobile application security library 114 is code that is integrated into the mobile application 110 and used in conjunction with the intermediate gateway 106 to authenticate the mobile device and provide other services described herein. The intermediate gateway 106 can include a firewall 120 and a mobile application security gateway 122 executing on a server computer that is generally separate from the server computer 104. As further described below, the intermediate gateway 106 can perform a variety of functions and benefits for applications running on mobile platforms. For example, the intermediate gateway 106 can implement a registration process that can make subsequent authentications simpler and increase security for the mobile application service provider. By so doing, the intermediate gateway 106 can focus on security while the mobile application service provider 104 can focus on the core business logic that it offers to mobile users. Examples, of security features offered by the intermediate gateway 106 include verification of the mobile device identification, authentication through public/private key technology, erasing of sensitive data on the mobile device when the mobile device is blocked, providing application version control to ensure the latest version of the application is on the mobile device, GPS location authentication, user statistics and audit trail information. Other services can easily be added through the scalable structure of the intermediate gateway.

Figure 2:
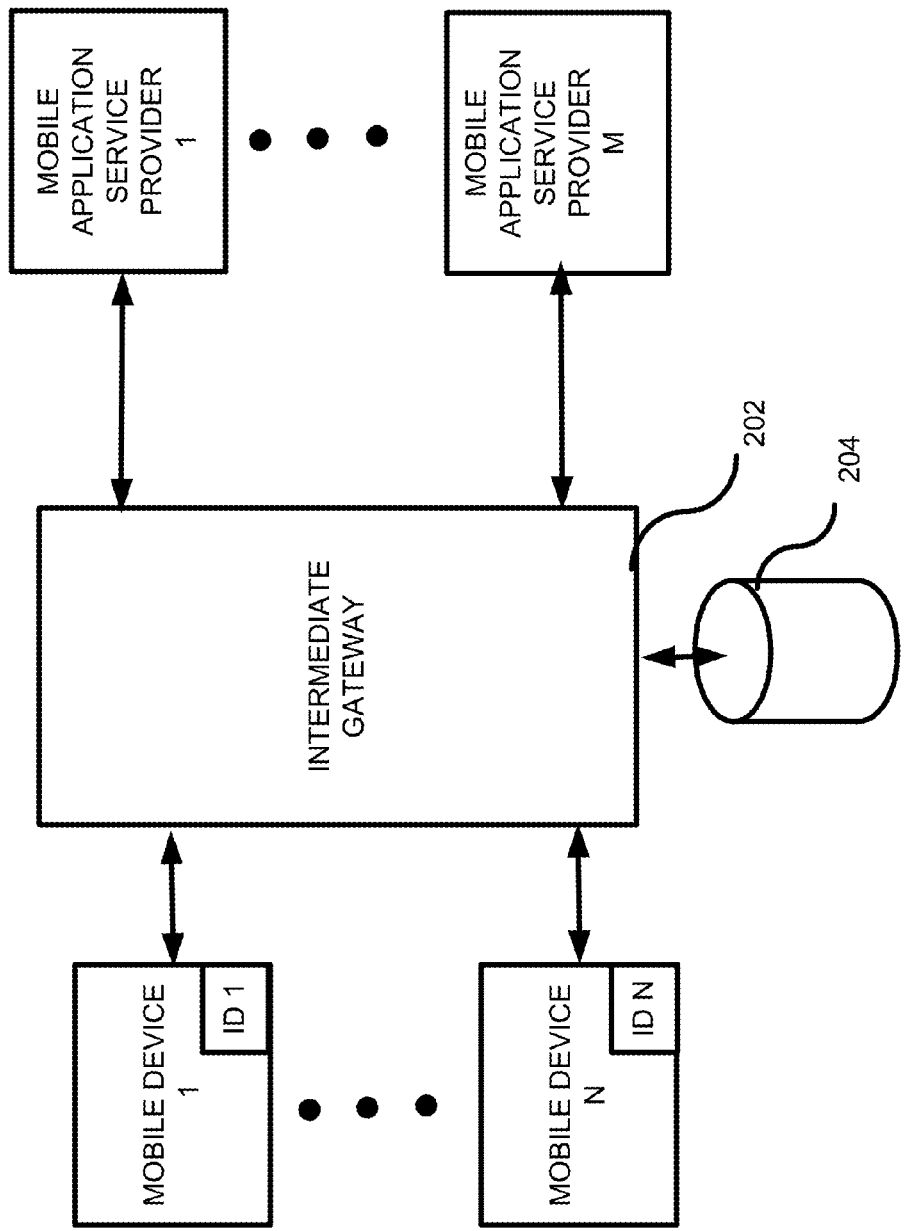
FIG. 2 is a system diagram illustrating multiple mobile devices and multiple application service provider servers coupled through the intermediate gateway.

FIG. 2 shows that an intermediate gateway 202 can be coupled to any number of mobile devices, such as indicated by mobile device 1 through mobile device N, where N can be any number. Each mobile device has a unique identifier associated therewith, indicated generically as ID 1 through ID N. The unique identifiers can be an International Mobile Equipment Identity (IMEI), IMEISV (IMEI Software Version), International Mobile Subscriber Identity (IMSI), GUID, or any other available or newly developed device identifiers. Likewise, the intermediate gateway can be coupled to any number of mobile application service providers as indicated by mobile application service provider 1 through mobile application service provider M, where M is any number. Typically, the mobile application service providers are associated with the same business. The intermediate gateway 202 can be coupled between the mobile devices and the mobile application service providers and is implemented on one or more server computers coupled to a database 204. The database can store mobile device identifiers used for authentications, as described herein.

Figure 3:
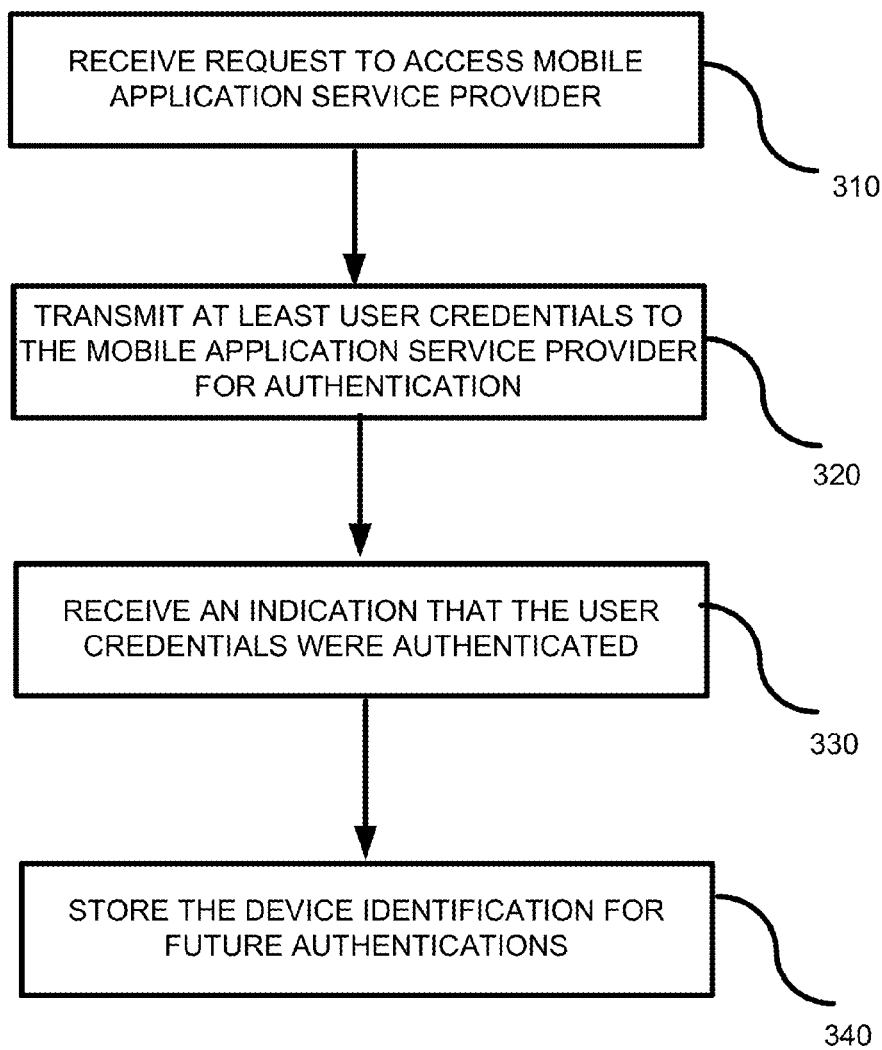
FIG. 3 is a flowchart of a method for authenticating a mobile device.

FIG. 3 is a flowchart of a method authenticating a client device using an intermediate gateway. In process block 310, the intermediate gateway is positioned between the client device and a mobile application service provider and receives a request to access the mobile application service provider. For a first-time registration process wherein the client device is not registered with the intermediate gateway, the intermediate gateway can transmit at least the user credentials to the mobile application service provider for authentication (process block 320). Additional information can be used, such as the device identification. The user credentials can include a login name and password, for example. In process block 330, the intermediate gateway receives an indication that the user credentials were authenticated. Typically, the intermediate gateway receives a message from the mobile application service provider verifying the user credentials. In process block 340, the device identification is stored in the intermediate gateway and can be used for future authentications.

Figure 4:
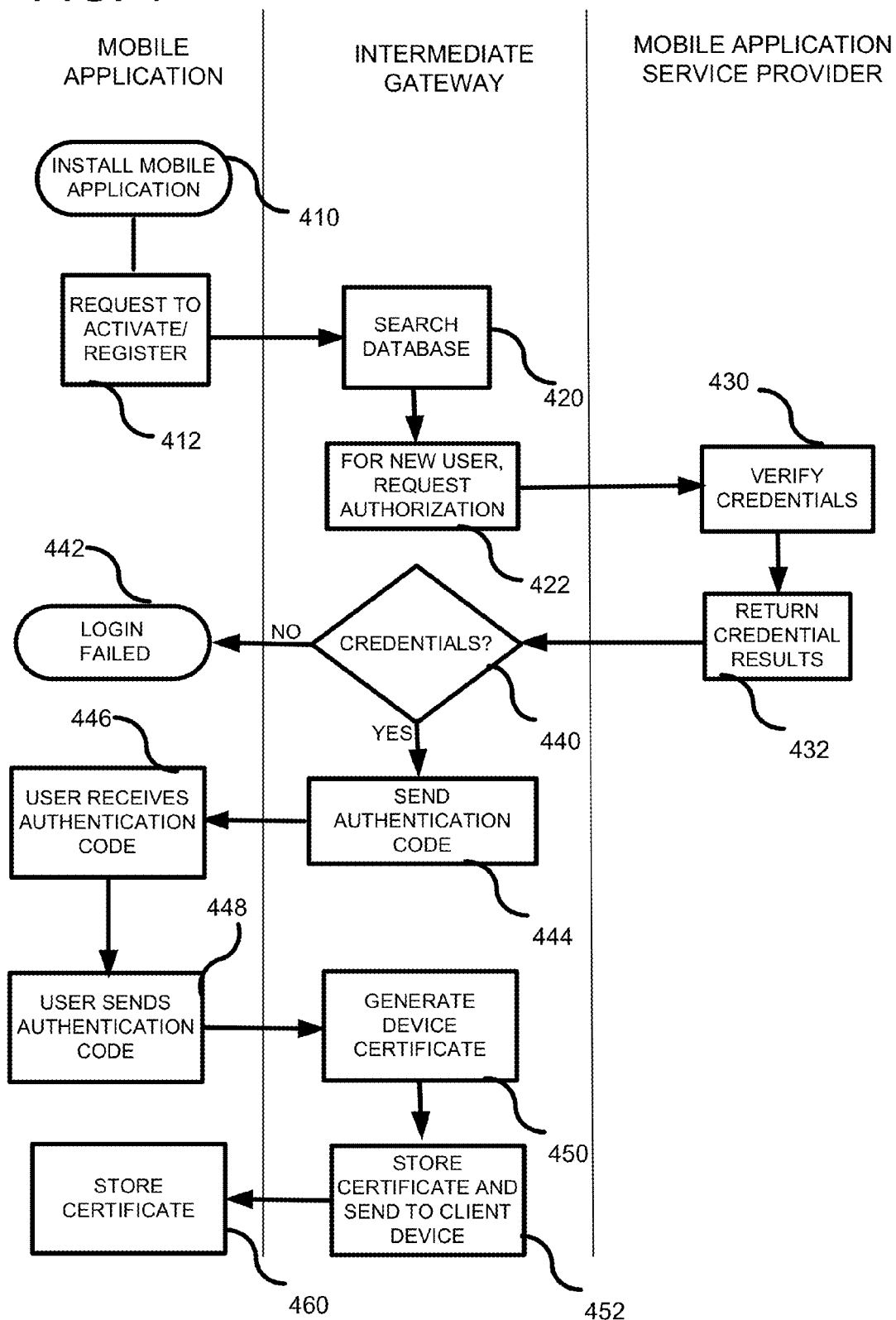
FIG. 4 is a flowchart of an embodiment illustrating registration of a mobile device with the intermediate gateway.

FIG. 4 is a detailed flowchart of a method for registering a client device. In process block 410, a user can install a mobile application. The mobile application is typically created by a mobile application service provider and can be downloaded from a so-called app store or directly from the mobile application service provider. In any event, the mobile application includes business rules that work in conjunction with business rules of the mobile application service provider to deliver a service to the client device. In process block 412, the mobile application on a client device transmits a request to activate/register the client device. The request can include the client identifier as well as user credentials and other parameters, if desired. In process block 420, a database (e.g., database 204 from FIG. 2) associated with the intermediate gateway can be searched to determine if the client device is already registered. The search can be performed by using a client identifier and/or a device identifier as a key to searching the database. For a new user, in process block 422, the intermediate gateway can transmit a request to the mobile application service provider to verify the user credentials. The mobile application service provider can then use the user credentials to authenticate the client device (process block 430). In process block 432, the mobile application service provider returns the results to the intermediate gateway. In decision block 440, the intermediate gateway decides whether the mobile application service provider authenticated the client device. If not, then the client device is notified of a login failure at process block 442. If the authentication was successful, then in process block 444, an authentication code can be sent to the user through a channel other than through the application, such as by a separate email or an SMS message. In process block 446, the user receives the authentication code and sends, by way of confirmation, the authentication code back to the intermediate gateway (process block 448). In process block 450, the intermediate gateway generates a device certificate. The device certificate can be a unique number that is then associated with the client device, stored on the intermediate gateway, and sent to the client device in process block 452. In process block 460, the client device stores the certificate for use in future authentications when the mobile application on the client device attempts to access the mobile application service provider.

Figure 5:
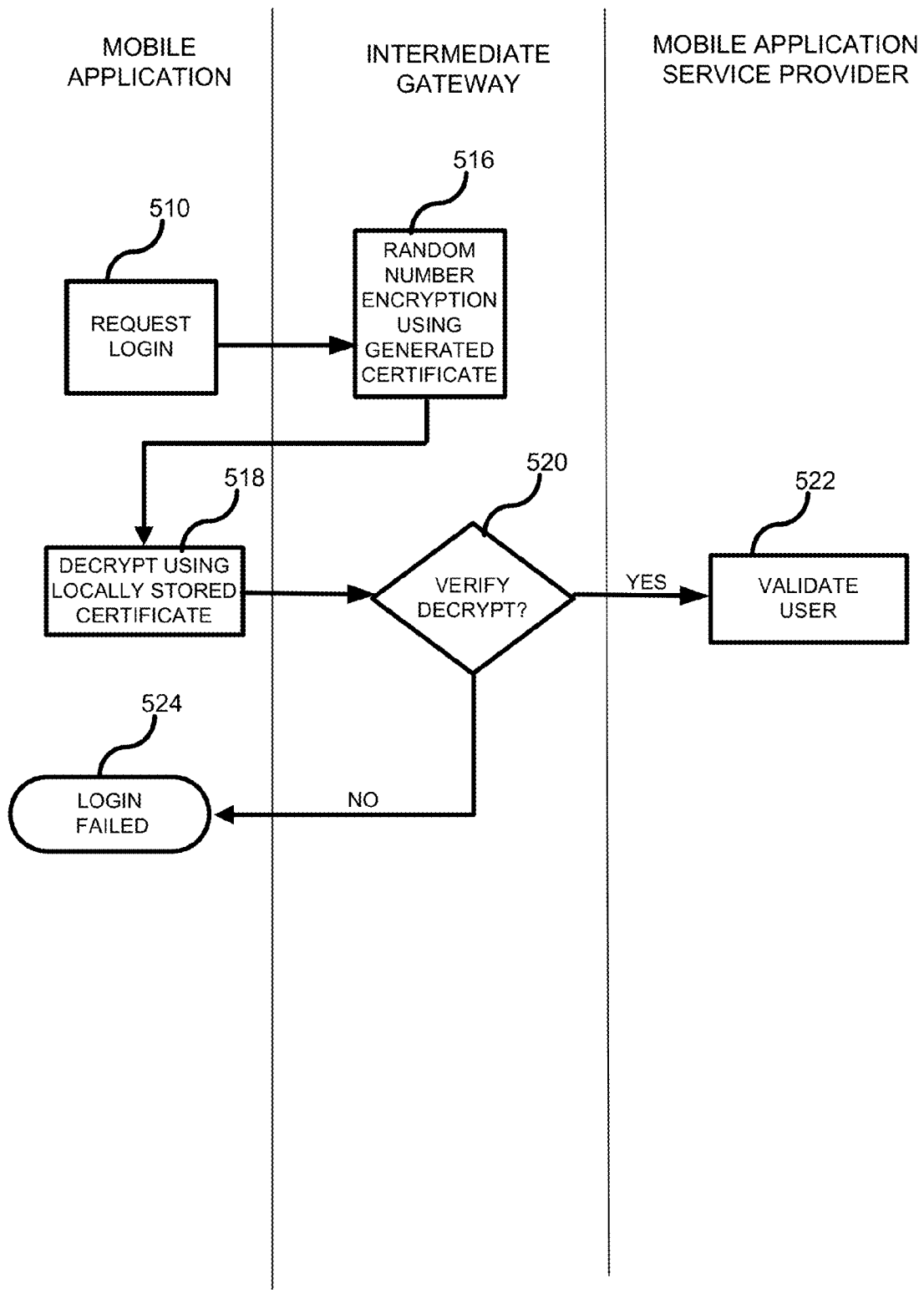
FIG. 5 is a flowchart of authenticating a mobile device after registration on the intermediate gateway.

FIG. 5 is a flowchart of a method for authenticating the client device on subsequent accesses of the mobile application service provider after registration of FIG. 4. In process block 510, the mobile application sends a request to access the mobile application service provider, such as through using an Internet connection to a predetermined address. The request can include the unique client identification together with user credentials. In process block 516, after searching for the client identification and determining that this is not a new user, the intermediate gateway can generate an encrypted random number using the certificate as a public key and transmit the encrypted key to the client device. In process block 518, the mobile application can decrypt the encrypted key using the stored certificate as a private key. In decision block 520, the intermediate gateway can verify the decryption in order to authenticate the client device without having to make a request for authentication from the mobile application service provider. If the decryption is not verified, then the login fails at process block 524. Otherwise, in process block 522, the request from the mobile application is sent to the mobile application service provider at 522, and the authenticated client device can be validated. At that point, the mobile application service provider can respond to the mobile application, which can receive the response and process the same.

Figure 6:
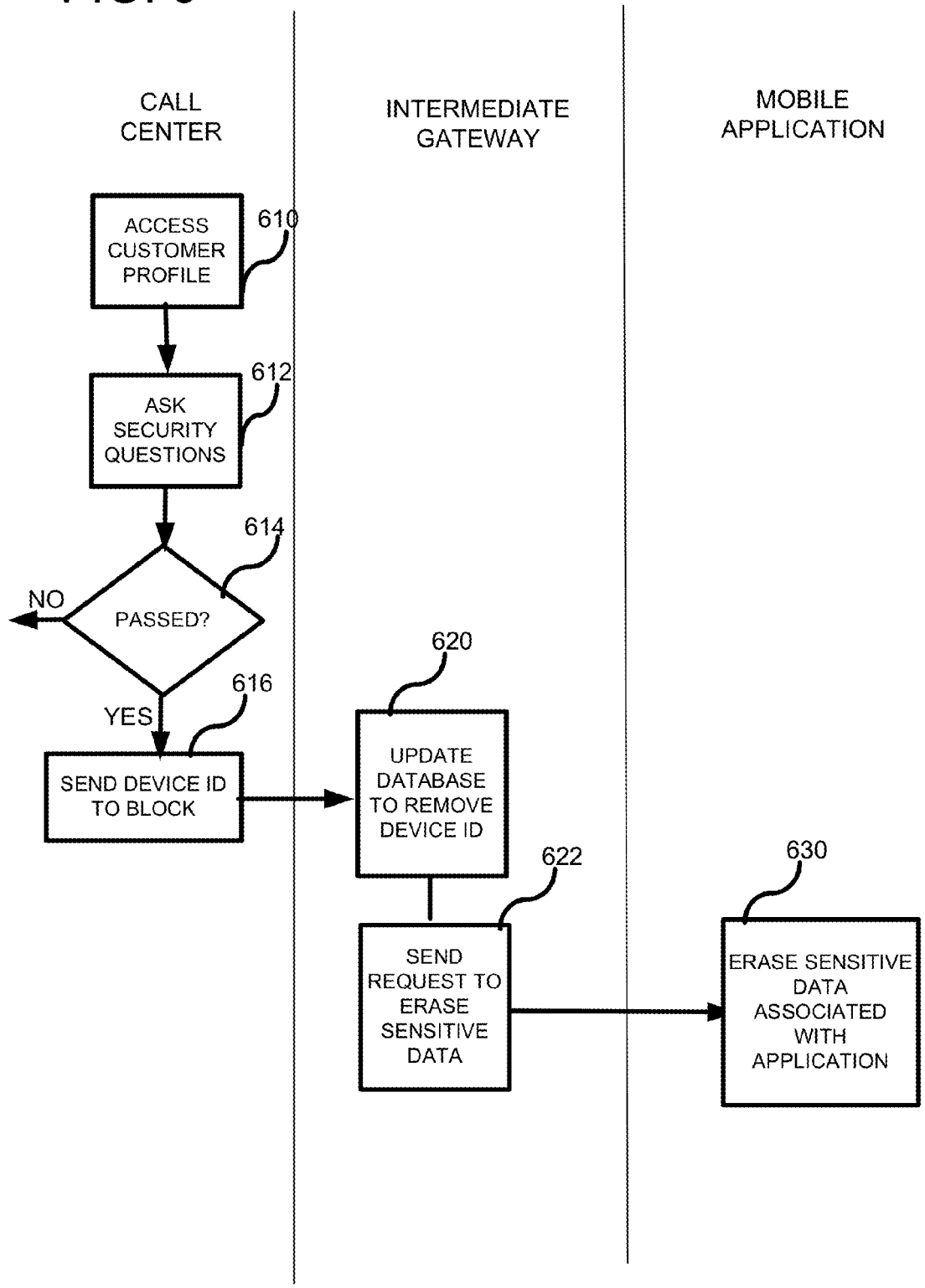
FIG. 6 is a flowchart of a method for erasing data on a mobile device.

FIG. 6 shows a flowchart of a method for erasing data associated with the mobile application, but without taking control of the client device itself. Such destruction of the mobile application data requires a user to re-register the client device with the intermediate gateway. One typical example of when a user needs to undertake such destruction of data is when the client device is lost or stolen. In process block 610, a user can call a call center, which accesses the customer profile. In process block 612, security questions can be asked in order to authenticate the user. In decision block 614, if the security questions failed, the caller is turned away. Otherwise, in process block 616, a transmission is made, as initiated by the call center, to block the client device. In process block 620, the database associated with the intermediate gateway is updated to remove the device identification. In process block 622 a request is made by the intermediate gateway to erase sensitive data. For example, a push request can be sent by the intermediate gateway. In process block 630, the sensitive data associated with the application is deleted from the client device in response to the message to block received by the intermediate gateway. If the push message is not delivered to the mobile application, then the data can be erased on the next access by the mobile application to the intermediate gateway. The code used to delete the data can be located in the mobile app security library 114 (FIG. 1).

Figure 7:
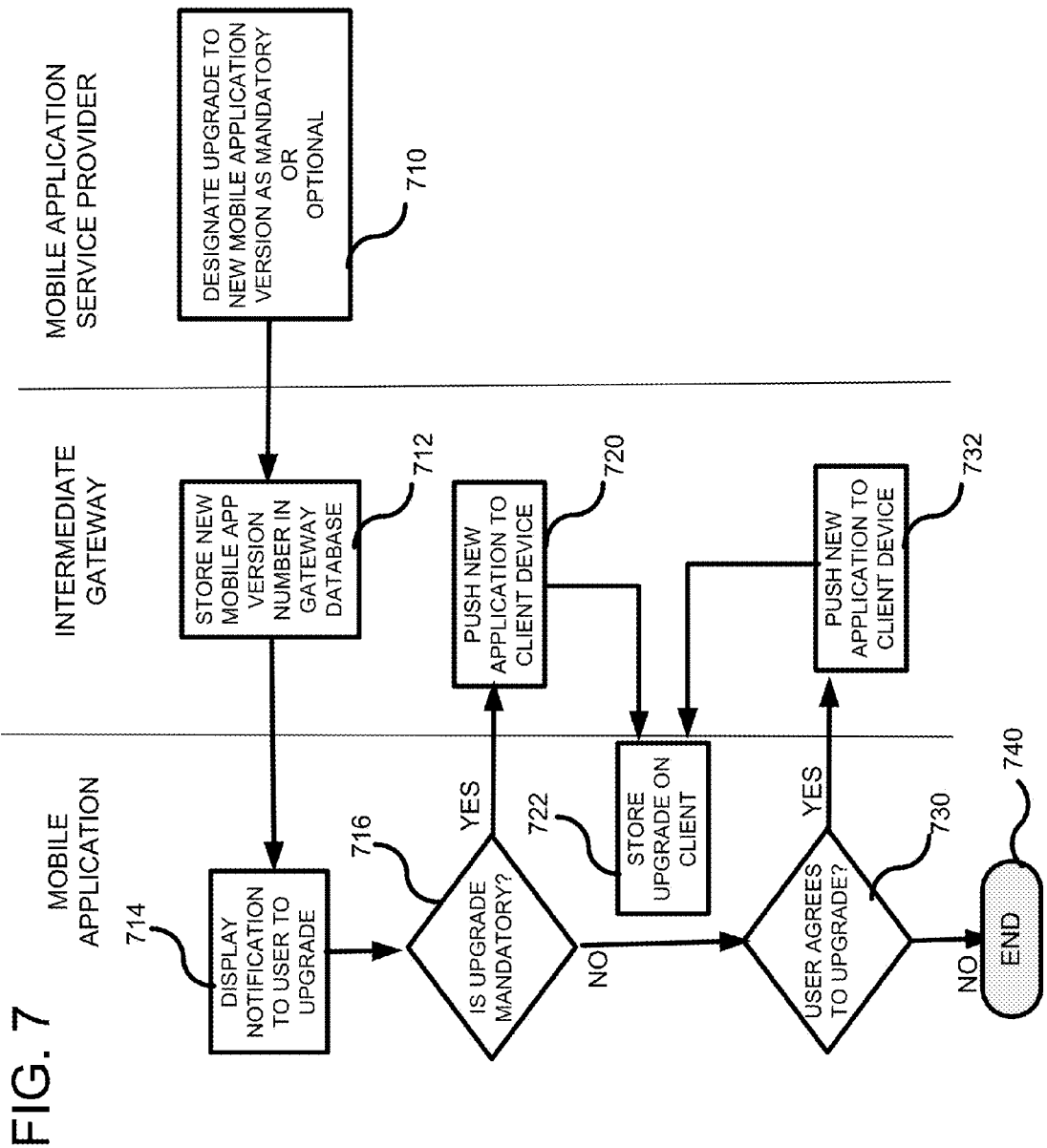
FIG. 7 is a flowchart of a method for upgrading an application on a mobile device.

FIG. 7 shows a flowchart of a method for upgrading the mobile phone application. In process block 710, a mobile application service provider provides a version upgrade of a mobile application on the client device. The upgrade can be a mandatory upgrade or an optional upgrade, as can be decided by the mobile application service provider. In process block 712, the intermediate gateway stores the latest version number as well as information whether upgrades are optional or mandatory. By storing the latest version number, the intermediate gateway can compare a received version from a client device to the stored version in order to effectuate version control. Thus, when an application on a client device requests a connection to the mobile application service provider, the mobile application can pass a version number of the application together with user credentials, device identification, and other parameters. If the version is out-of-date, in process block 714, the client application displays a notification to the user of the client device to upgrade the application together with an indication of whether the upgrade is mandatory or optional. At decision block 716, if the upgrade is mandatory, the client device has no option but to accept the upgrade, and at process block 720, the intermediate gateway pushes the new application to the client device. Alternatively, process block 720 can be controlled from an application store. At process block 722, the client device stores the upgrade. If the upgrade is optional, then in decision block 730, the user can optionally choose whether or not to perform the upgrade. If the user agrees, then at process block 732, the new application is pushed to the client device and stored as shown at process block 722. If the user optionally decides to not install the upgrade, then at process block 740, the mobile application can continue to access the mobile application service provider using an outdated version of the mobile application.

Figure 8:
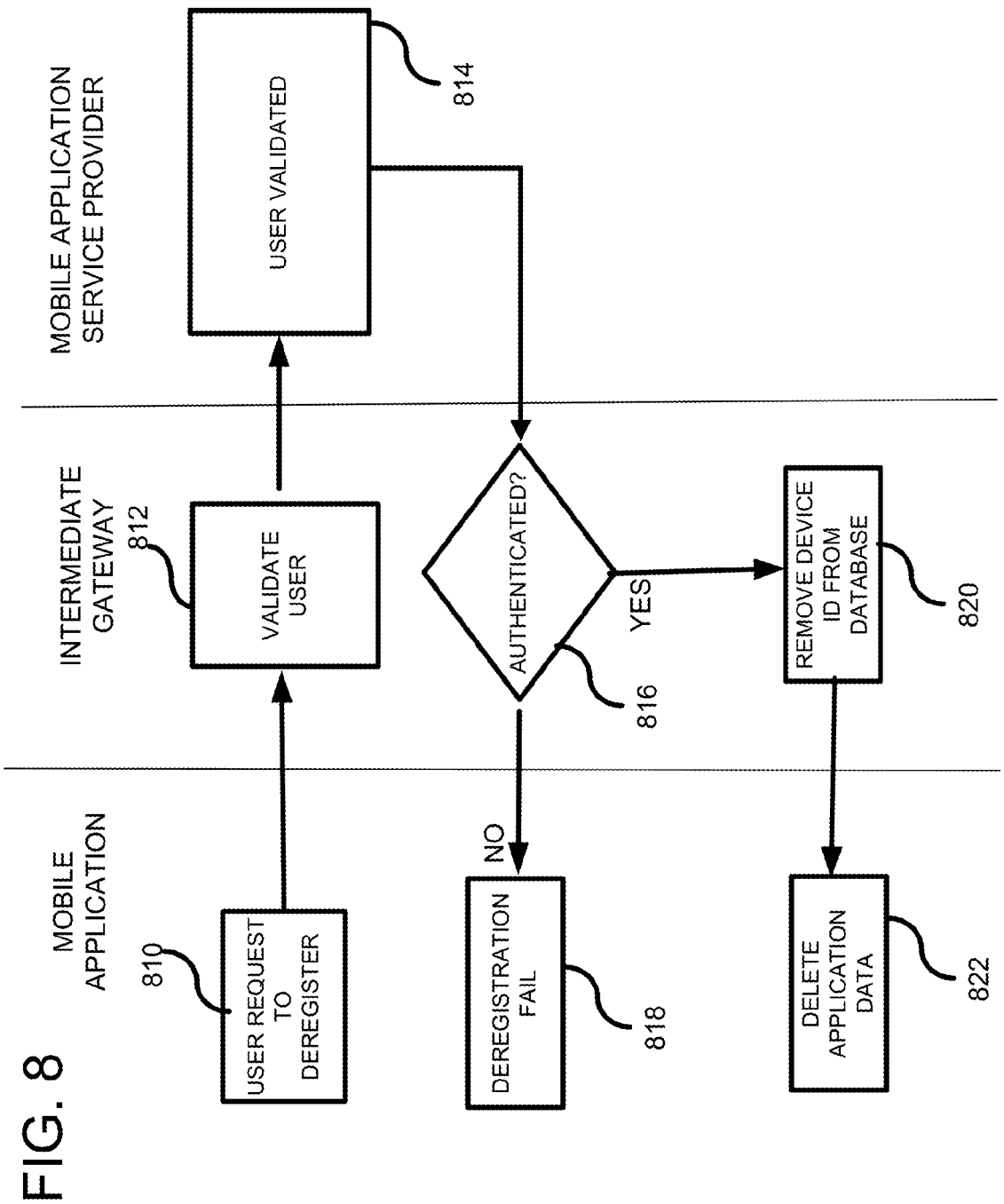
FIG. 8 is a flowchart of a method for deregistering a mobile device from the intermediate gateway.

FIG. 8 shows a flowchart of a method for deregistering a client device. In process block 810, a user requests deregistration from the intermediate gateway. In order to deregister, the client device can supply a device identification and user credentials to the intermediate gateway. At process block 812, the user is validated by the intermediate gateway, as already described. In process block 814, the intermediate gateway passes the deregistration request to the mobile application service provider, which validates the user credentials. The mobile application service provider can then deregister the user from the mobile application service provider, if desired. In decision block 816, a check is made at the intermediate gateway whether the user was authenticated by the mobile application service provider. If not, then deregistration failed at process block 818 and the client device can be so notified. If authentication was successful, then at process block 820, the intermediate gateway can remove the device identification from its' associated database. At process block 822, sensitive application data associated with the deregistered mobile application can then be erased from the client device.

Figure 9:
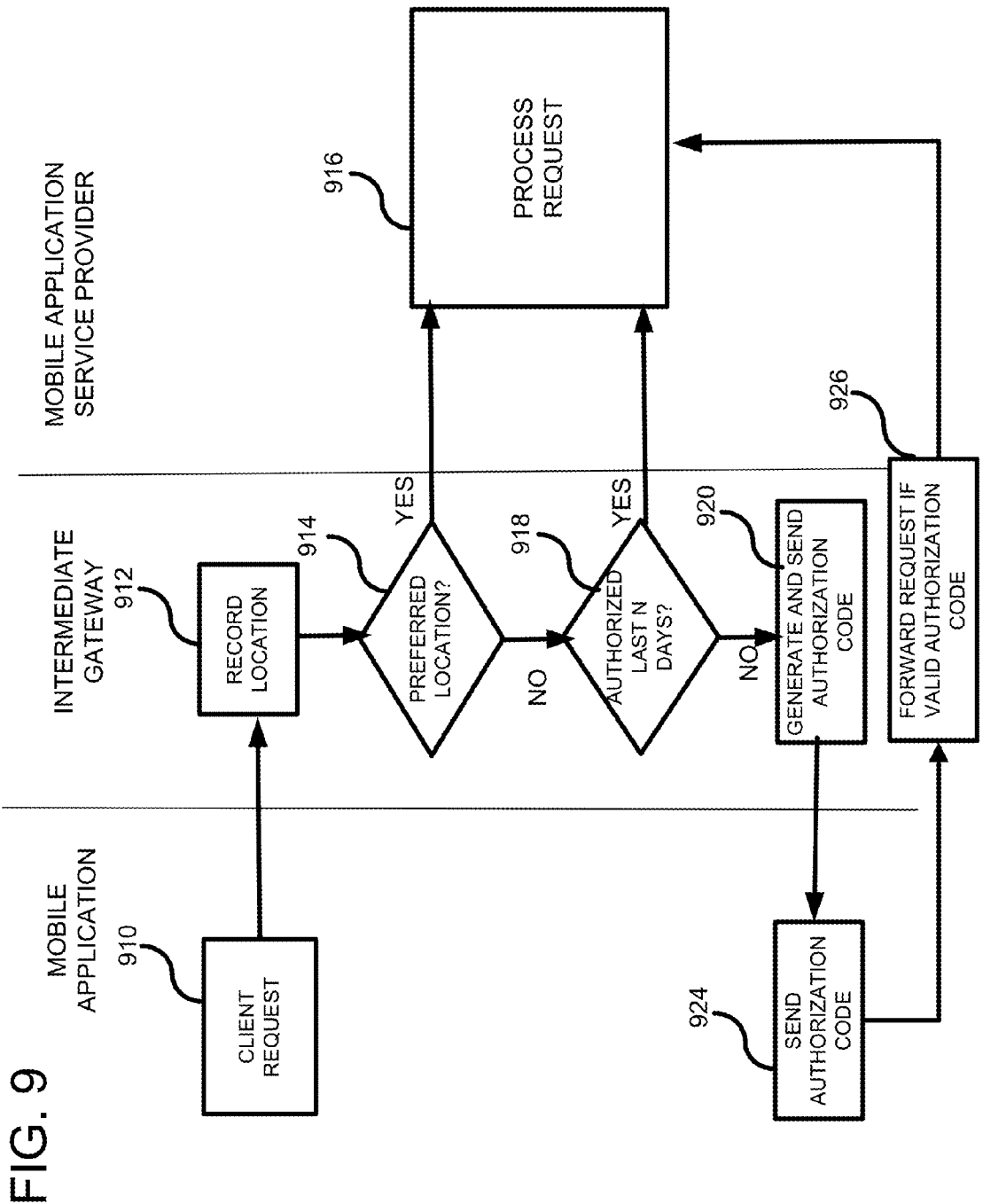
FIG. 9 is a flowchart of a method for authenticating a mobile device using GPS location data.

FIG. 9 shows a flowchart of a method for using location-based authentication. In process block 910, a client request is made to access a mobile application service provider. The request can include a device identification, user credentials, and a location of the mobile device (such as determined by GPS or cell tower location). In process block 912, the location of the client device is recorded. For example, GPS coordinates can be stored in the database associated with the intermediate gateway in a location associated with the device identification. In decision block 914, an authentication algorithm can be used to determine if the location of the client device is satisfactory. The authentication algorithm can be based on user input of the client device on acceptable locations. For example, the user can input cities at which he/she will be located. Authentication can be based, in part, on such locations. The specific algorithm used depends on the particular application, and any desired algorithm can be used. If the algorithm is satisfied, then the request is sent to the mobile application service provider and processed (process block 916). If decision block 914 is answered in the negative, then at decision block 918, a check is made whether authorization occurred within a predetermined period of time. Thus, either a location-based authentication or a time-based authentication or both can be used as part of the authentication. If decision block 918 is answered in the affirmative, then authentication can also be granted based on the period of time since last authenticated. In such a case, the request can be passed to the mobile application service provider to process the request (process block 916). If neither decision block 914, 918 is satisfied, then an authorization code can be sent from the intermediate gateway to the client device at process block 920. In turn, the client device transmits (process block 924) the authorization code back to the intermediate gate way. At process block 926, if the authorization code confirms authentication, the request is forwarded to the mobile application service provider. Although not shown, once the request is processed by the mobile application service provider at process block 916, a response is sent through the intermediate gateway to the mobile application to satisfy the request.

Figure 10:
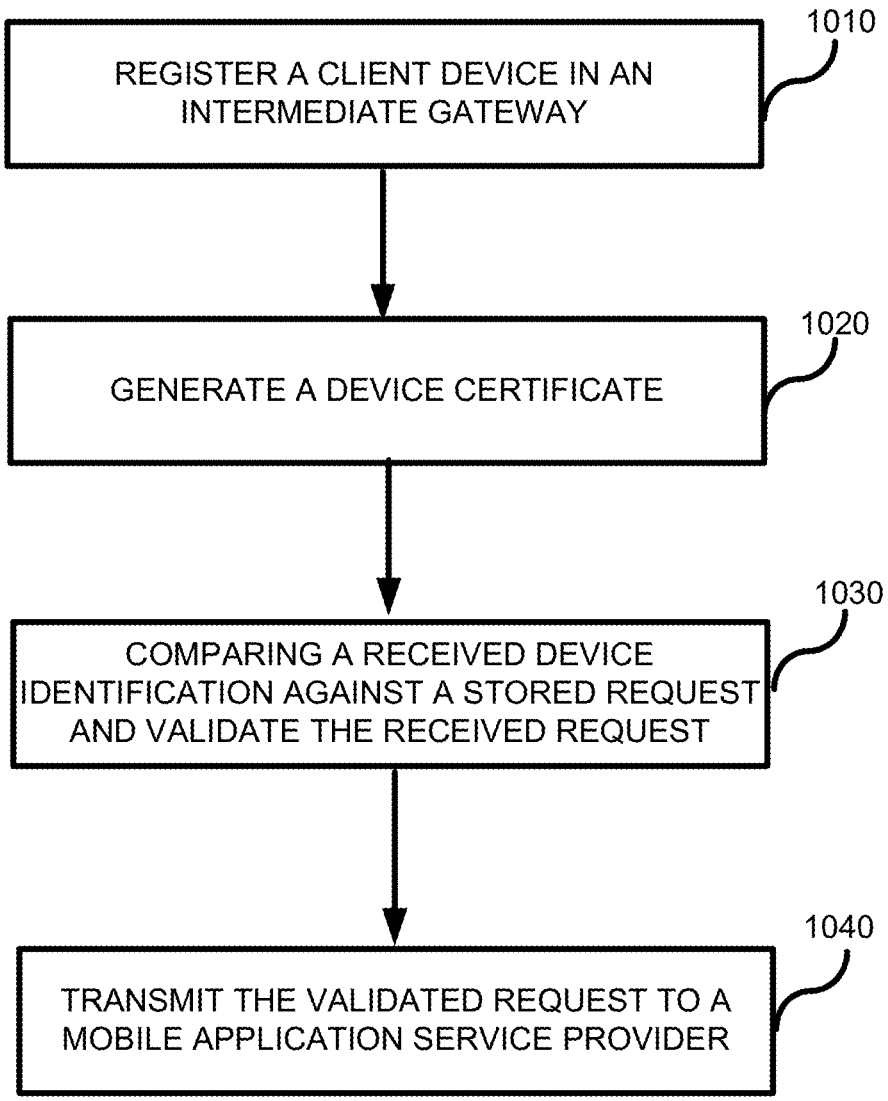
FIG. 10 is a flowchart of a method for authentication a mobile device.

FIG. 10 is a flowchart of a method according to another embodiment for authenticating a client device using an intermediate gateway. In process block 1010, a client device is registered in the intermediate gateway. In process block 1020, a device certificate is generated and can be stored on the client device. The certificate can be used for public key/private key authentication. In process block 1030, a device identification received by the intermediate gateway is compared against a stored identification to determine if the client device is authenticated. If so, in process block 1040, the request is transmitted to the mobile application service provider.

Figure 11:
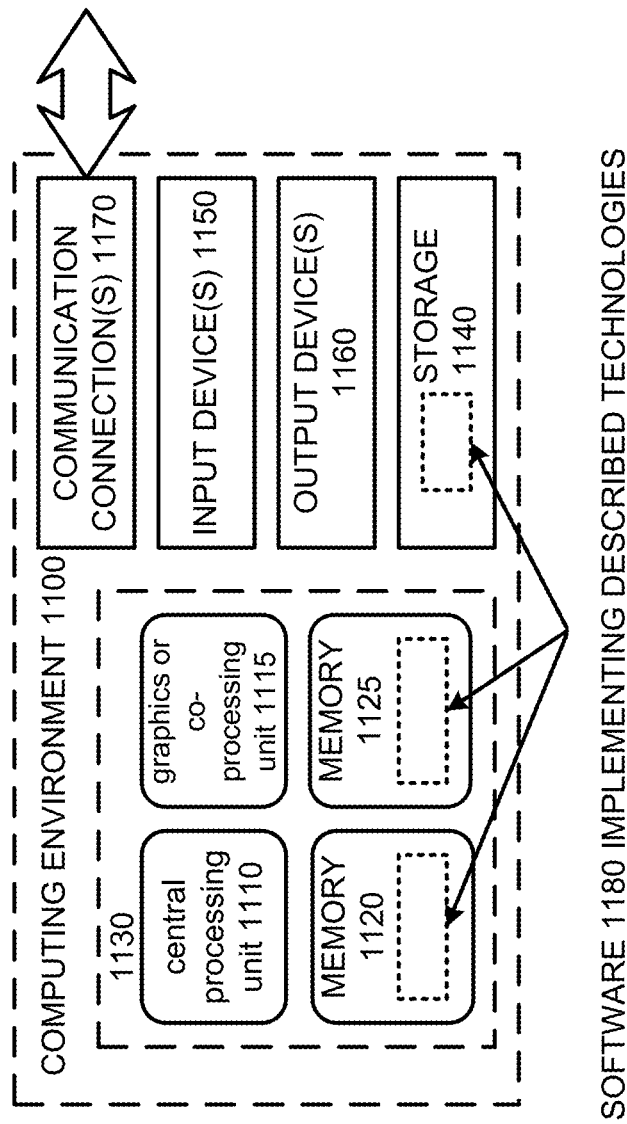
FIG. 11 is a diagram of an exemplary computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1100, 1115 and memory 1120, 1125. This basic configuration 1130 is included within a dashed line. The processing units 1100, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, a central processing unit 1100 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system. Typically, operating system software (not shown) provides an operating environment for other software executing in the computing system, and coordinates activities of the components of the computing system.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system. For video encoding, the input device(s) 1150 may be a camera, video card, TV tuner card, or similar device that accepts video input in analog or digital form, or a CD-ROM or CD-RW that reads video samples into the computing system. The output device(s) 1160 may be a display, printer, speaker, CD-writer, or another device that provides output from the computing system.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 12:
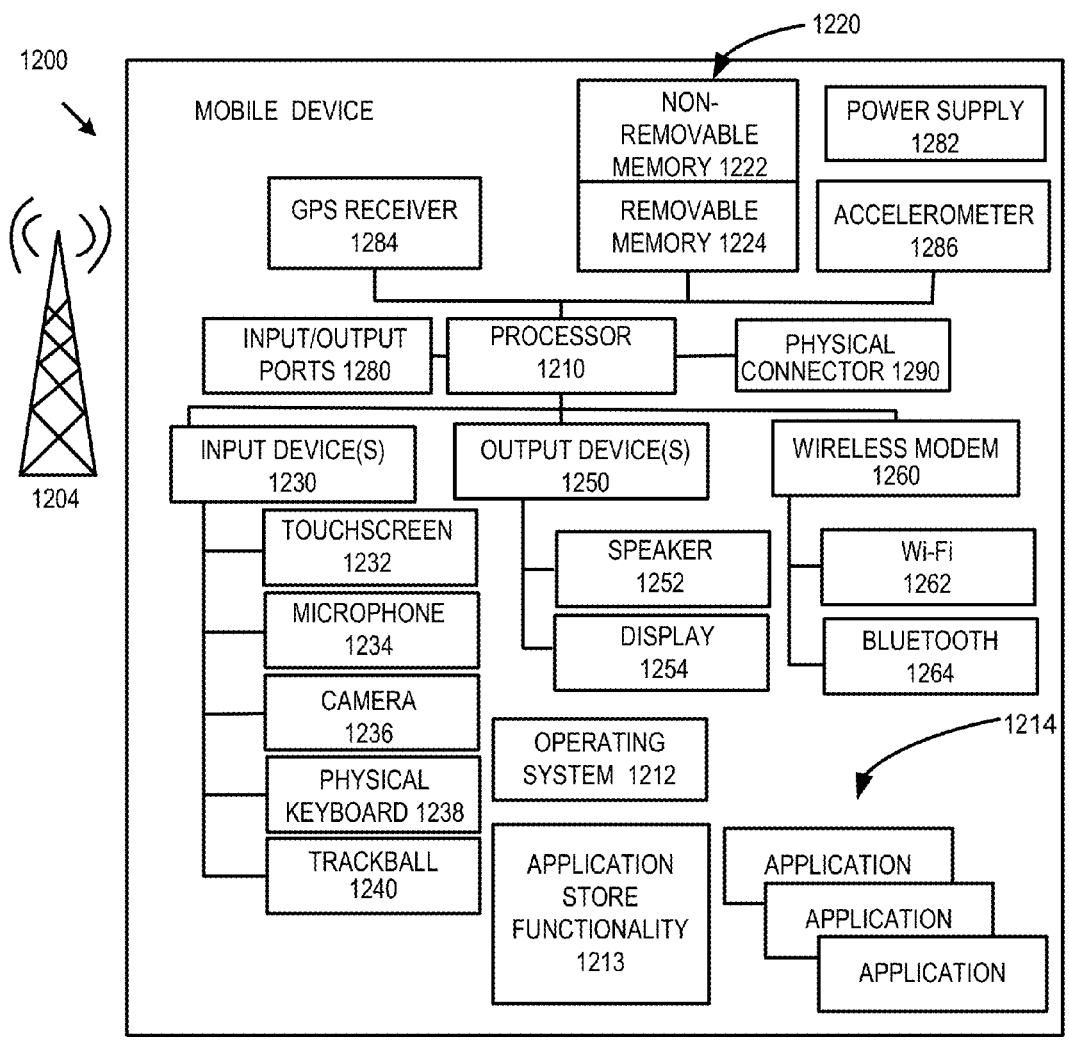
FIG. 12 is an exemplary mobile device that can be used in conjunction with the technologies described herein.

FIG. 12 is a system diagram depicting an exemplary mobile device 1200 including a variety of optional hardware and software components, shown generally. Any components in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1204, such as a cellular, satellite, or other network.

The illustrated mobile device can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components and support for one or more application programs 1214. The application programs can include common mobile computing applications (e.g., email applications, calendars, contact managers, web browsers, messaging applications), or any other computing application. Functionality 1213 for accessing an application store can also be used for acquiring and updating applications 1214.

The illustrated mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running the operating system 1212 and the applications 1214. Example data can include web pages, text, images, sound files, video data, or other data sets to be sent to and/or received from one or more network servers or other devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1200 can support one or more input devices 1230, such as a touch screen 1232, microphone 1234, camera 1236, physical keyboard 1238 and/or trackball 1240 and one or more output devices 1250, such as a speaker 1252 and a display 1254. Other possible output devices (not shown) can include piezoelectric or other haptic output devices. Some devices can serve more than one input/output function. For example, touchscreen 1232 and display 1254 can be combined in a single input/output device.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth 1264 or Wi-Fi 1262). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components are not required or all-inclusive, as any components can deleted and other components can be added.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or nonvolatile memory components (such as flash memory or hard drives)).

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of authenticating a client device, comprising:
receiving a first request from a mobile application on the client device to access a mobile application service provider, the request including a device identification and user credentials and being received by an intermediate gateway positioned between the client device and the mobile application service provider;
transmitting, by the intermediate gateway, at least the user credentials to the mobile application service provider for authentication;
receiving, at the intermediate gateway, an indication that the user credentials were authenticated by the mobile application service provider;
in response to the authentication, storing the device identification for future authentications of the mobile application by the intermediate gateway;
generating a device certificate and transmitting the device certificate to the client device;
receiving, at the intermediate gateway, the device identification together with a second request from the mobile application to access the mobile application service provider;

comparing the device identification against stored device identifications in the intermediate gateway;

if the device identification is matched against one of the stored device identifications, encrypting information in the intermediate gateway and transmitting the encrypted information to the client device, the encrypted information being decryptable with the device certificate;

receiving information decrypted with the device certificate from the client device so as to authenticate the second request from the mobile application.

2. The method of claim 1, further including transmitting to the client device an authentication code to be used by the client device to complete authentication.

3. The method of claim 1, further including transmitting the request to the mobile application service provider after the client device is authenticated.

4. The method of claim 1, further including blocking the request from the client device to access the mobile application service provider due to failing the authentication.

5. The method of claim 1, sending, from the intermediate gateway, a request to erase data associated with the mobile application.

6. The method of claim 1, further including either requesting the client device to update the mobile application or forcing the client device to update the mobile application prior to accessing the mobile application service provider, if an upgrade is designated as mandatory by the mobile application service provider.

7. The method of claim 1, further including checking a Global Positioning System (GPS)-based location of the client device and transmitting the request to the mobile application service provider only if the GPS-location matches a location authentication algorithm.

8. The method of claim 1, further including tracking usage statistics using the intermediate gateway.

9. The method of claim 8, wherein the usage statistics include one or more of the following: platform type, platform version, mobile application name, mobile application version, or a number of people using the mobile application.

10. The method of claim 1, wherein the intermediate gateway can only control data associated with the mobile application on the client device, and not the client device itself.

11. The method of claim 1, wherein the client device is in an environment wherein a business cannot control the client device.

12. A computer-readable storage device having instructions stored thereon for executing a method according to claim 1.

13. A system for authenticating a client device, comprising:
an application configured for installation on the client device that includes a security library, the security library having instructions therein for allowing an intermediate gateway to control data associated with the application;
an application service provider configured to receive requests from the application over a network and that responds to the received requests; and
the intermediate gateway positioned between the client device and the application service provider for authenticating the client device when the application attempts to access the application service provider, the intermediate gateway configured to:
receive a first request from the application on the client device to access the application service provider, the request including a device identification and user credentials;
transmit at least the user credentials to the application service provider for authentication;
receive an indication that the user credentials were authenticated by the application service provider and store the device identification;
generate a device certificate and transmit the device certificate to the client device;
receive, at the intermediate gateway, the device identification together with a second request from the application to access the application service provider;
compare the device identification against stored identifications in the intermediate gateway;
if the device identification is matched against one of the stored device identifications, transmit encrypted information to the client device, the encrypted information being decryptable with the device certificate;
receive information decrypted with the device certificate from the client device so as to authenticate the second request from the application.

14. The system of claim 13, wherein the intermediate gateway can erase sensitive data associated with the application and stored on the client device.

15. The system of claim 13, wherein the intermediate gateway includes a database of device identifications.

16. The system of claim 13, wherein the intermediate gateway is for generating a certificate to be stored on the client device and used when accessing the application service provider.

17. A computer-readable storage device having instructions thereon for executing a method of authenticating a client device, the method comprising:
registering the client device including receiving a request from a mobile application on the client device for registration, the request including a device identification of the client device, requesting authorization for the device identification from a mobile application service provider and based on the authorization, storing the device identification of the client device on an intermediate gateway positioned between the client device and the mobile application service provider;
generating a device certificate to be stored on the client device;
transmitting the device certificate to the client device;
upon receiving a request and a device identification, by the intermediate gateway, from the client device to access the mobile application service provider, comparing the received device identification against a stored authorized device identification and validating the received request, in part, using the comparison;
upon the validation of the received request, transmitting an encrypted data to the client device by the intermediate gateway;
receiving data back from the client device in decrypted form so as to further validate the received request, wherein the data is obtained by decrypting the encrypted data by the client device using the device certificate; and
transmitting the validated received request from the client device to the mobile application service provider via the intermediate gateway.

18. The computer-readable storage device of claim 17, wherein the method further includes receiving a request from the client device to deregister itself from the intermediate gateway.

19. The computer-readable storage device of claim 17, wherein the intermediate gateway is coupled between multiple client devices and multiple mobile application service providers.

20. The computer-readable storage device of claim 17, further including storing transactions from the client device to the mobile application service provider in the intermediate gateway for tracking of transactions over a period of time.

\* \* \* \* \*